United States Patent
Krodel et al.

(10) Patent No.: US 7,014,824 B2
(45) Date of Patent: Mar. 21, 2006

(54) METHOD FOR PURIFYING PROCESS WASTE GASES

(75) Inventors: Gunter Krodel, Dresden (DE); Lutz Fabian, Dresden (DE); Volkmar Hopfe, Kleingiesshübel (DE)

(73) Assignee: Centrotherm Elektrische Anlagen GmbH & Co., Blaubeuren (DE)

( * ) Notice: Subject to any disclaimer, the term of this patent is extended or adjusted under 35 U.S.C. 154(b) by 724 days.

(21) Appl. No.: 09/725,428

(22) Filed: Nov. 29, 2000

(65) Prior Publication Data

US 2001/0012500 A1    Aug. 9, 2001

Related U.S. Application Data

(63) Continuation of application No. PCT/DE99/01581, filed on May 31, 1999.

(30) Foreign Application Priority Data

May 29, 1998   (DE)   ............................. 198 24 287

(51) Int. Cl.
   *B01D 53/46*   (2006.01)
   *F23G 7/06*    (2006.01)
   *F23J 15/04*   (2006.01)

(52) U.S. Cl. ............... 423/210; 423/240 R; 423/240 S; 423/241; 423/245.1; 423/245.3; 423/481; 423/483; 364/496; 364/499; 364/500; 700/266; 700/267; 700/271; 700/273

(58) Field of Classification Search ............ 423/240 R, 423/240 S, 241, 245.1, 245.3, 481, 483, 210; 700/266, 267, 271, 273; 364/496, 499, 500
See application file for complete search history.

(56) References Cited

U.S. PATENT DOCUMENTS

| | | | | |
|---|---|---|---|---|
| 4,101,632 A | * | 7/1978 | Lamberti et al. | 110/345 |
| 4,208,381 A | * | 6/1980 | Isahaya et al. | 422/105 |
| 4,229,411 A | * | 10/1980 | Kisters et al. | 422/109 |
| 5,088,424 A | * | 2/1992 | Sardari et al. | 110/214 |
| 5,900,217 A | | 5/1999 | Hartung et al. | 422/171 |
| 6,030,591 A | * | 2/2000 | Tom et al. | 423/240 S |
| 6,069,291 A | * | 5/2000 | Rossin et al. | 423/483 |

FOREIGN PATENT DOCUMENTS

| | | |
|---|---|---|
| DE | 19600873 | 10/1997 |
| DE | 19714740 | 12/1998 |
| EP | 0347753 | 12/1989 |
| EP | 0463839 | 1/1992 |

* cited by examiner

Primary Examiner—Ngoc-Yen Nguyen
(74) Attorney, Agent, or Firm—Baker Botts LLP

(57) ABSTRACT

The present invention relates to a method for purifying process waste gases by introducing them into a waste gas purification system that includes a reaction chamber and by post-treating the reaction products that leave the reaction chamber in a washing or sorbtion chamber with an associated washing agent circuit. The type and amount of harmful substances in the process waste gas are continuously measured before the waste gases enter the waste gas purification system. In addition, the type and amount of harmful substances in the reaction products that leave the waste gas purification system are simultaneously determined directly at the exit of the system and the measuring signals are used to regulate the operating parameters of the waste gas purification system.

13 Claims, 1 Drawing Sheet

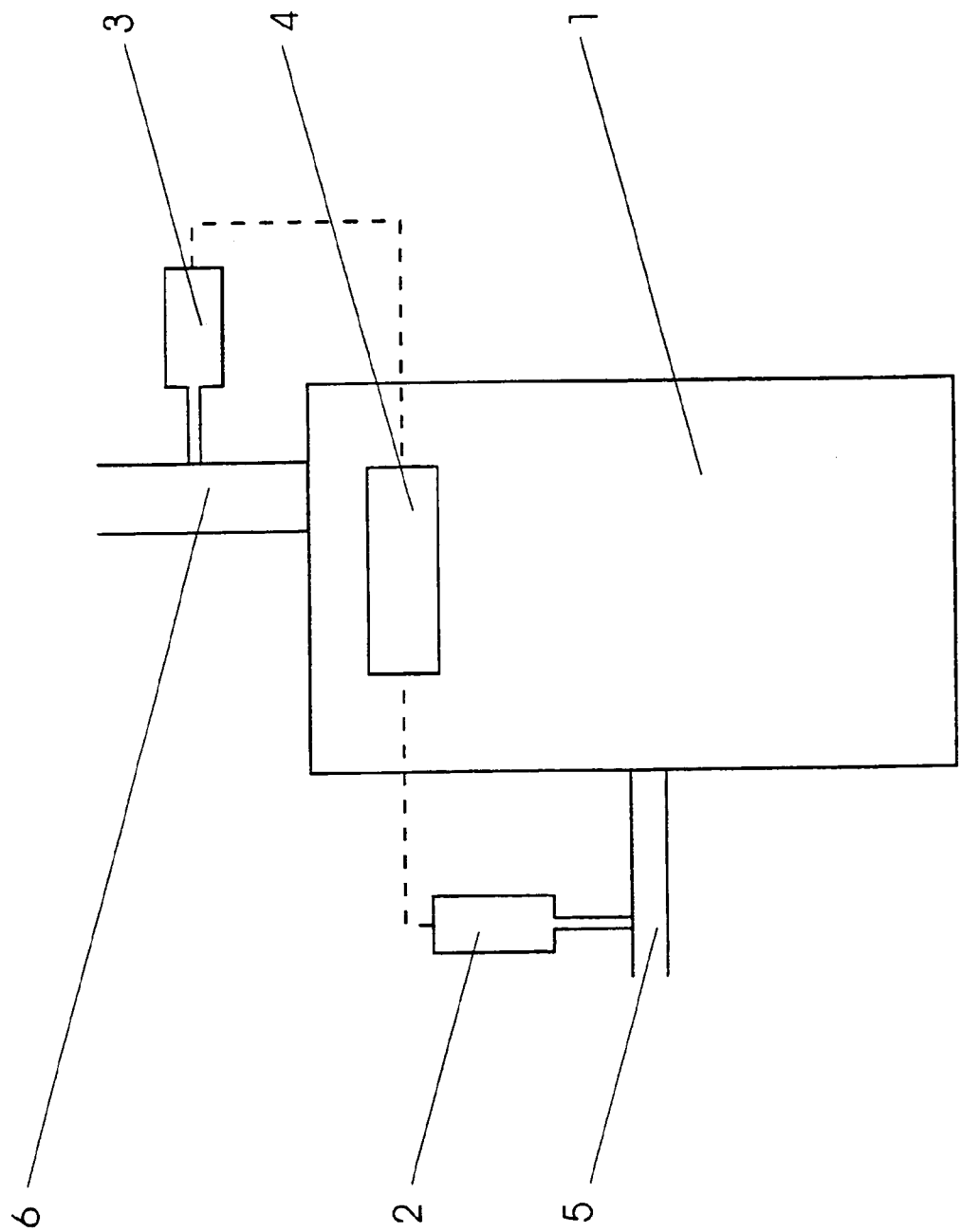

METHOD FOR PURIFYING PROCESS WASTE GASES

This is a continuation of copending International application No. PCT/DE99/01581 filed May 31, 1999.

FIELD OF THE INVENTION

The invention relates to a method for purifying process waste gases by introducing them into a waste gas purification system having a reaction chamber and by post-treating the reaction products leaving the reaction chamber in a washing or sorbtion chamber with an associated washing agent circuit.

BACKGROUND OF THE INVENTION

A variety of methods have been disclosed as purification methods for process waste gases, wherein mainly thermal purification methods have been used in the prior art.

For example, a method has been disclosed wherein process waste gases are oxidized or thermally decomposed in a reaction chamber. This takes place by means of a flame fed by a combustible gas and oxygen. The waste gases leaving the reaction chamber pass into a washing or sorbtion chamber in which the solid and/or soluble constituents are washed out of the waste gas with a sorbtion agent. Hydrogen or alternatively natural gas, for example, may be considered as possible combustible gases. The waste gases, now purified of harmful or poisonous constituents, are then drawn out into the atmosphere by an exhaust system.

Process waste gases, in particular waste gases enriched with harmful substances from chemical vapor deposition (CVD) and/or etching processes and chamber-cleaning processes, are purified by such a known method so that pollution of the environment with harmful or possibly toxic substances is avoided. In particular, process waste gases from systems for chemical processing of semiconductor substrates for the production of microelectronic components by means of low-pressure CVD processes (LP-CVD) may be purified or converted into harmless substances by such a method.

Such a waste gas purification method follows, for example, from EP 0,347,753 B1, according to which process waste gases are burned in a reaction chamber under excess oxygen and are passed through a washing or sorbtion chamber to an exhaust system. DE 195 01 914 C1 describes a similar process waste gas purification arrangement. In this arrangement, an outer cylinder encloses a combustion chamber. The outer cylinder also contains a burner with a burner flame, which is directed downward. A sorbtion chamber lies on top of the combustion chamber. The waste gases leaving the combustion chamber are conducted upward within the outer cylinder into the sorbtion chamber and are carried away through a filter by an exhaust system into the atmosphere. For intensive wetting of the waste gases flowing through the sorbtion chamber and reliably washing the solid reaction products from the gases, the sorbtion agent, e.g. water, is sprayed against the direction of flow of the waste gas. The sorbtion agent may, for example, alternatively be sprayed conically against the direction of flow of the waste gas. Then, the solid reaction products are washed downward along the inner wall of the outer cylinder and passed into a separating system for the sorbtion agent.

The process waste gases coming from a low-pressure CVD plant may, for example, contain $SiH_4$, $PH_3$, and $N_2O$ in variable oxidation states and concentrations, as well as oil vapors and particulate matter (such as $SiO_2$). These process waste gases are burned in the flame of an oxyhydrogen burner, which is operated with excess oxygen. Instead of the oxyhydrogen burner, which preferably is operated as an internal-mixing burner with a hydrogen/oxygen mixture, a burner operated with natural gas or liquid gas may alternatively be used.

German patent DE-A-19600873 discloses a method for purifying process waste gases by introducing them into a waste gas purification system having a reaction chamber and by post-treating the reaction products leaving the reaction chamber in a washing or sorbtion chamber with an associated washing agent circuit. This reference also shows regulation of the waste gas purification method (Col. 8, lines 20–28). However, this reference uses only the following information to measure and control the process: pressure, temperature, and volumetric flow of the waste gas supplied, in addition to parameters of wash liquid, flame, oxygen supply, and combustible gas supply.

In view of the above, a need exists for a method of purifying waste gases in which the type and amount of harmful substances in the process waste gas are continuously measured before the waste gases enter the waste gas purification system. In addition, a need exists for a method in which the type and amount of harmful substances in the reaction products that leave the waste gas purification system can be determined directly at the exit of the system, and in which the measuring signals can be used directly in order to regulate the operating parameters of the waste gas purification system.

OBJECTS AND SUMMARY OF THE INVENTION

It is, therefore, an object of the present invention to purify process waste gases by continuously measuring them directly before the gases enter the waste gas purification system, simultaneously and continuously determining directly the type and amount of selected harmful substances of the reaction products leaving the system, and using directly the resulting measuring signals in order to regulate the operating parameters of the system. These and other objects of the invention will become apparent from the detailed description and examples that follow.

The present invention ensures effective waste gas purification, even in the case of process waste gases that are successively or simultaneously produced in a variety of processes or those of highly variable composition.

The present invention is provided preferably for waste gas purification methods wherein the process waste gases are treated thermally. The method may alternatively be used in conjunction with other methods for waste gas purification.

The present invention provides a method for purifying process waste gases by introducing them into a waste gas purification system having a reaction chamber and by post-treating the reaction products leaving the reaction chamber in a washing or sorbtion chamber with an associated washing agent circuit. Measuring signals are used directly for adjusting the operating parameters of the waste gas purification system.

In an embodiment of the invention, the amounts of harmful substances are determined by using a first and a second detector for selected harmful substances.

Another embodiment of the invention provides that upon detection of at least one of the harmful substances by the first detector, the operating parameters of the waste gas purification system are preset with empirical values with reference to amount of combustible gas, amount of oxygen (generally excess oxygen), amount of washing agent in the washing agent circuit, and pH of the washing agent.

Another embodiment of the invention provides that the operating parameters of the waste gas purification system are adjusted as a function of the measured values of the second detector in such a way that the concentration of harmful substances at the exit of the waste gas purification system is regulated to a minimum.

Another embodiment of the invention provides that the measuring signals are obtained in a noninvasive and contactless manner.

Another embodiment of the invention provides that the pH and/or the amount of the washing agent is increased upon the detection of an elevated concentration of hydrogen fluoride (HF) by the second detector.

Still another embodiment of the invention provides that the type and amount of harmful substances are simultaneously calculated by a computer internal to the system on the basis of the measured results of the first and second detectors. The operating parameters of the waste gas purification system are continuously regulated as a function of the entry and exit-side amounts of harmful substances. The operating parameters are also regulated in accordance with the amount of process gas supplied.

BRIEF DESCRIPTION OF THE DRAWINGS

Further objects and advantages of the present invention will be more fully appreciated from a reading of the detailed description when considered with the accompanying drawings wherein:

The FIGURE is a schematic diagram of a waste gas purification system having a first detector, a second detector, a computer, an entry, and a clean gas exit.

DETAILED DESCRIPTION OF THE INVENTION

FIG. 1 is a schematic diagram of a waste gas purification system in accordance with the present invention. In a waste gas purification system 1, which works according to the principle of thermal decomposition or oxidation in a flame with subsequent washing of the reaction products, the process waste gases are to be removed from a chamber-cleaning process of a semiconductor CVD system. $C_2F_6$ and $O_2$ are generally used for this chamber-cleaning process. The waste gas from this chamber-cleaning process contains, in addition to the starting substances and nitrogen of the vacuum pump, reaction products such as $CF_4$ and $C_4F_8$. This process waste gas is sent to the waste gas purification system 1, which at the entry 5 has a first detector 2 that analyzes the process waste gas by type and amount. Preferably, the first detector 2 is a contactless detector, such as a Fourier transform infrared spectrometer with which Gas-phase Fourier transform infrared spectroscopy (FTIR) is used as the preferred measuring method. A second detector 3, whose mode of operation is comparable to that of the first detector 2, is arranged at the purified gas exit 6 of the waste gas purification system 1.

If the first detector 2 at the entry 5 of the waste gas purification system 1 detects one or more of the gases mentioned above, the purification system 1 is preset by a connected computer 4, on the basis of the types of gas and their concentrations, with regard to amount of combustible gas, amount of oxygen (generally excess oxygen), amount of washing agent in the washing agent circuit, and pH of the washing agent. In addition to the perfluorocarbons $C_2F_6$, $CF_4$ and $C_4F_8$, HF is also detected at the clean gas exit 6.

For reasons of both environmental protection and cost, as little combustible gas and supplementary oxygen as possible should be used in the purification system. At the same time, substantially all toxic constituents of the process waste gas entering the reaction chamber should be completely converted into harmless substances. In order to achieve this objective, the composition of the process waste gas must be known, so that the required amount of combustible gas and supplementary oxygen can be established. In addition, the flame must be constantly monitored in order to ensure optimal combustion.

Since the composition of process waste gases is generally known, as happens when such gases come from only one process, the method parameters are usually determined by empirical values, or by a stoichiometric calculation. The present invention requires removal of substantially all harmful substances from the process waste gas. Thus, regardless of the purification method utilized, excess amounts of the required stoichiometric components, e.g., excess oxygen and combustible gas, should be supplied. However, when successively or simultaneously purifying process waste gases from a variety of processes or process waste gases of highly variable composition, considerable difficulties occur in determining the necessary method parameters. Thus, the method for waste gas purification becomes much more expensive.

The present invention provides a method in which the type and amount of harmful substances in the process waste gas are continuously measured directly before selected process waste gases enter the waste gas purification system 1. In addition, the type and amount of selected harmful substances of the reaction products leaving the waste gas purification system are continuously determined directly at the clean gas exit 6 of the purification system. At the exit 6 of the waste gas purification system 1, selected harmful substances, such as perfluorocarbons and hydrofluoric acid, are monitored using the second detector 3. Furthermore, measuring signals from the first detector 2 and/or second detector 3 are provided to the computer 4 and are used for adjusting the operating parameters of the waste gas purification system.

The amounts of harmful substances preferably are determined by the first detector 2 and the second detector 3 for selected harmful substances, where, for example, at least one of the perfluorocarbons $C_2F_6$, $CF_4$, $C_4F_8$, and $O_2$ is detected at the first detector 2 and at the second detect 3 and HF is, in addition, detected at the second detector 3. In this regard, it is advantageous if the operating parameters of the system are regulated as a function of the amounts of harmful substances in the process waste gas.

Upon detection of at least one of the harmful substances by the first detector 2, the operating parameters of the waste gas purification system 1 are preset with empirical values with reference to the amount of combustible gas, the amount of oxygen (generally excess oxygen), the amount of washing agent in the washing agent circuit, and the pH of the washing agent. In particular, the operating parameters are preset by a self-learning algorithm in the computer 4 on the basis of comparatively determined waste gas species and concentrations of harmful substances. This has the advantage that the efficiency of the waste gas purification system and the basic settings are constantly optimized, thus leading to a shortened startup phase of the waste gas purification system.

In another embodiment of the invention, the operating parameters of the waste gas purification system are adjusted as a function of the measured values of the second detector 3 so that the concentration of harmful substances at the exit 6 of the waste gas purification system is minimized. In particular, the operating parameters are adjusted so that the concentration of harmful materials drops to close to the threshold of measurement.

As noted above, it is preferable that the measuring signals are obtained in a noninvasive and contactless manner. This has the special advantage that any especially aggressive components of the process waste gases to be purified cannot influence the result of measurement or the measuring device. The measuring signals preferably are obtained by optical spectroscopy, such as by way of an FTIR spectrometer.

In a refinement of the invention, the pH and/or the amount of the washing agent is increased upon the detection of an elevated concentration of HF by the second detector 3. On the other hand, if an elevated concentration of combustible/oxidizable or thermally decomposable harmful substance is detected by the second detector 3, the amount of combustible gas and/or the amount of oxygen supplied is increased.

In an additional embodiment of the invention, the types and amounts of harmful substances are calculated by the computer 4 internal to the system on the basis of the measured results of the first detector 2 and second detector 3, and the operating parameters of the waste gas purification system are regulated as a function of the entry and exit-side amounts of harmful substances, while the operating parameters are regulated in accordance with the amount of process waste gas supplied. Preferably, the calculation of the types and amounts of the harmful substances at the first and second detectors takes place substantially simultaneously and the operating parameters are regulated substantially continuously.

The method according to the invention has the special advantage that the consumption of combustible gas is minimized and that the long-term stability of the residual emissions can be guaranteed, so that the otherwise customary control measurements may be omitted. Service intervals may also be lengthened, since due to unavoidable deposits, e.g., in the burner, resulting variations in operating parameters can automatically be controlled. In addition, the method ensures a great dynamic range of measurable concentrations, so that only a single measuring device suffices for the entire range.

The measuring method can also be used in batteries of systems. In addition, the introduction of harmful substances into the waste gas purification arrangement can be continuously recorded, so that control of the preceding semiconductor process becomes possible.

An added special advantage of the method according to the invention is that it may be used independently of the purification method used in the waste gas purification system. The method according to the invention thus is not limited to any particular type of waste gas purification, but is alternatively suitable for nonthermal methods. The difference consists only in that other operating parameters of the waste gas purification system are to be regulated in each instance.

EXAMPLE

The invention is to be explained in detail by an example and an associated drawing.

In a waste gas purification system 1, which works according to the principle of thermal decomposition or oxidation in a flame with subsequent washing of the reaction products, the process waste gases are to be removed from a chamber-cleaning process of a semiconductor CVD system. $C_2F_6$ and $O_2$ are generally used for this chamber-cleaning process. The waste gas from this chamber-cleaning process contains, in addition to the starting substances and nitrogen of the vacuum pump, reaction products such as $CF_4$ and $C_4F_8$.

The gas purification system 1 operates in a controlled manner. For example, as waste gas is processed by the gas purification system 1, HF, along with other compounds, is produced upon conversion of the perfluorocarbons in the flame. If, for example, a concentration higher than 1 ppm HF is measured by the second detector 3 at the clean gas exit 6, the pH of the washing agent and/or the amount of washing agent in the circuit can be increased. The same procedure can be followed with perfluorocarbons. When the concentration at the clean gas exit 6 is too high, the amount of combustible gas and/or the amount of oxygen (depending upon the species) changes accordingly. By this method, the consumption of agents used in the waste gas purification system 1 is continuously optimized, operating costs are kept down, and optimal purification of the waste gas is achieved.

The computer 4 operates under the control of software, which preferably is self-learning. The optimal operating conditions determined are used as the basis for presetting the waste gas purification system 1 for comparable waste gas species and concentrations. As a result, the basic settings are also continuously optimized and the startup phase of the waste gas purification system 1 is shortened.

In the conversion of $C_2F_6$, reaction products are produced in addition to the gases mentioned above, which likewise may be included in the analysis. When there are too many components, however, analysis and targeted influence on the operating conditions of the waste gas purification system 1 become more difficult. The components mentioned above were selected for a variety of practical reasons. For example, $C_2F_6$ probably has the highest concentration of any reaction gas. $CF_4$ is the most chemically stable perfluorocarbon. $C_4F_8$ may be highly toxic. HF is produced in the flame in great amounts upon the conversion of perfluorocarbons. While conversion of perfluorocarbons is influenced primarily by combustible gas parameters, washing agent parameters also affect the removal of acid gas constituents (such as HF).

What is claimed is:

1. A method for purifying process waste gases containing selected harmful substances comprising:

introducing the process waste gases with combustible gas and oxygen into a waste gas purification system having a combustion chamber, an exit, and operating parameters, including amount of combustible gas and amount of oxygen;

post-treating reaction products leaving the combustion chamber in a sorbtion chamber with an associated washing agent circuit containing washing agent having a selectable pH;

measuring with a first detector the type and amount of selected harmful substances in the process waste gas before said waste gases enter the waste gas purification system to generate first measuring signals;

determining with a second detector the type and amount of selected harmful substances of the reaction products leaving the waste gas purification system at the exit of the purification system to generate second measuring signals; and directly using the first and second measuring signals for adjusting the operating parameters of the waste gas purification system, including amount of combustible gas, amount of oxygen, amount of washing agent in the washing agent circuit, and pH of the washing agent.

2. The method according to claim 1, wherein the operating parameters are regulated as a function of the amounts of selected harmful substances in the process waste gas.

3. The method according to claim 1, wherein upon detection of at least one of the selected harmful substances by the first detector, the operating parameters of the waste gas purification system are preset with empirical values with reference to the amount of combustible gas, the amount of oxygen, the amount of washing agent in the washing agent circuit, and the pH of the washing agent.

4. The method according to claim 3, wherein the operating parameters are preset by a self-learning system on the basis of comparatively determined waste gas species and concentrations of harmful substances.

5. The method according to claim 2, wherein upon detection of at least one of the selected harmful substances by the first detector, the operating parameters of the waste gas purification system are preset with empirical values with reference to the amount of combustible gas, the amount of oxygen, the amount of washing agent in the washing agent circuit, and the pH of the washing agent.

6. The method according to claim 5, wherein the operating parameters are preset by a self-learning system on the basis of comparatively determined waste gas species and concentrations of harmful substances.

7. The method according to claim 1, wherein the operating parameters of the waste gas purification system are adjusted as a function of the measuring signals of the second detector in such a way that the concentration of selected harmful substances at the exit of the waste gas purification system is regulated to a minimum.

8. The method according to claim 1, wherein the measuring signals are obtained in a contactless manner.

9. The method according to claim 1, wherein the measuring signals are obtained by optical spectroscopy.

10. The method according to claim 1, wherein if an elevated concentration of a selected harmful substance is detected by the second detector then at least one of the pH of the washing agent and the amount of the washing agent is increased.

11. The method according to claim 1, wherein if elevated concentrations of selected harmful substances are detected by the second detector the amount of combustible gas and/or the amount of oxygen supplied is increased.

12. The method according to claim 1, wherein the type and amount of harmful substances are substantially simultaneously calculated by a computer in the waste gas purification system on the basis of the measuring signals of the first and second detectors, and the operating parameters of the waste gas purification system are regulated as a function of the amounts of harmful substances measured by the first detector and by the second detector.

13. The method according to claim 1, wherein the operating parameters are regulated in accordance with the amount of process waste gas supplied.

* * * * *